Patented Dec. 31, 1929

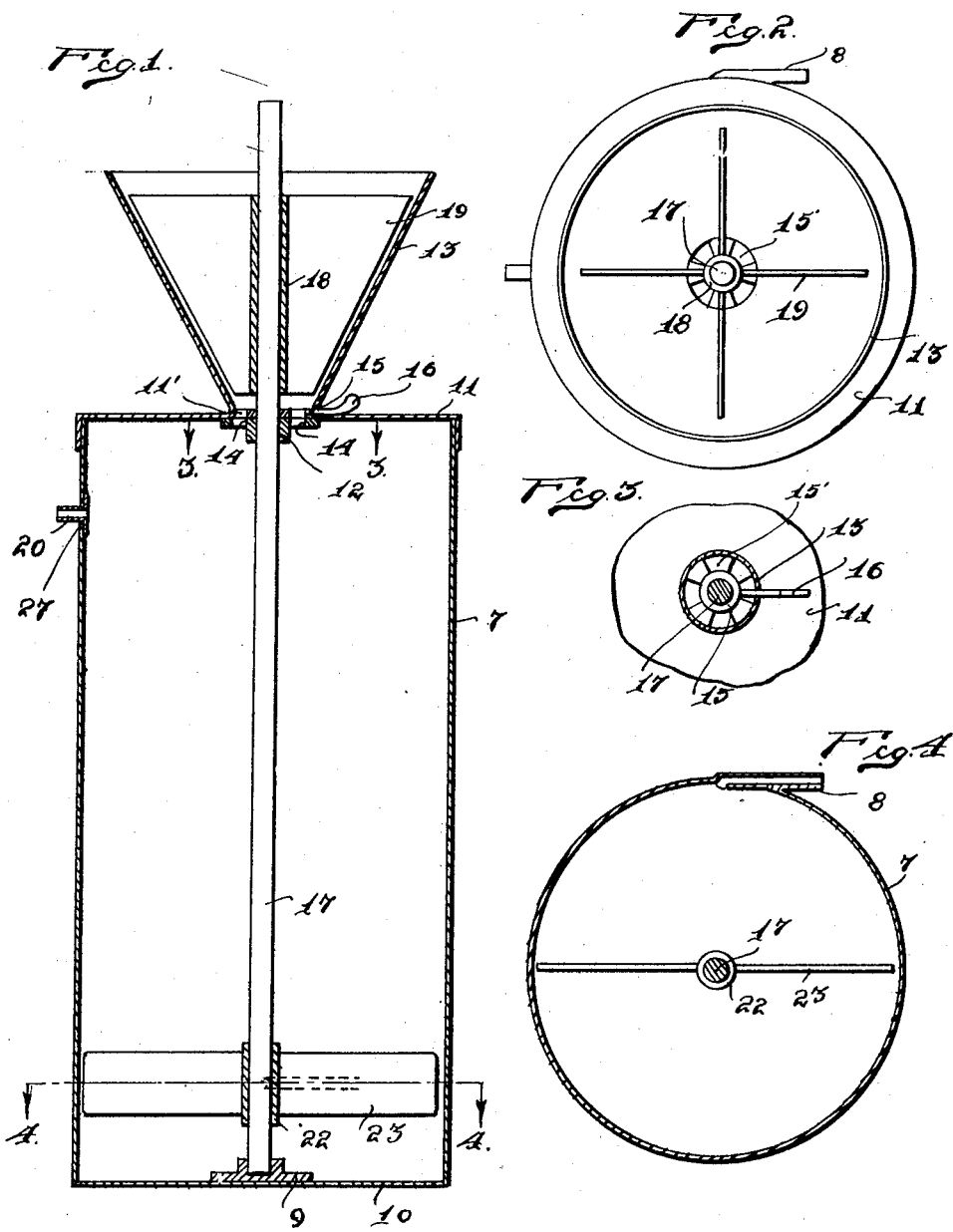

1,741,646

UNITED STATES PATENT OFFICE

CLAUDIUS NIELSEN, OF DETROIT, MICHIGAN

MIXING MACHINE

Application filed June 22, 1926. Serial No. 117,678.

My invention relates to a new and useful improvement in a mixing machine of that type in which it is desirable to have a flow of water in which a substance may be mixed while the water is flowing, an example of such use being the mixing with flowing water of a suitable cleansing powder.

It is an object of the present invention to provide a mixer of this class which will be simple in structure, economical of manufacture, and highly efficient in use.

Another object of the invention is the provision of a container into which and from which water is constantly flowing, and mechanism for mixing with the water as it is about to leave the container the substance desired to be mixed.

Another object of the invention is the provision of a device of which class of means for controlling the amount of substance deposited in the water.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a top plan view of the invention.

Fig. 3 is a fragmentary sectional view taken on substantially line 3—3 of Fig. 1.

Fig. 4 is a sectional view taken on substantially line 4—4 of Fig. 1.

I have illustrated in the drawings a method of using the invention in which a container 7 is utilized having an inlet conduit 8 communicating therewith and extending tangentially outwardly from the periphery for the attachment of a hose or other suitable conduit which may be connected to a suitable source of water under pressure such as the city water supply. It will be noted that the water when delivered into the container 7 through the conduit 8 is directed as nearly as possible tangentially to the container 7 so as to set up a rotary motion in the water which is already contained in the container.

Mounted on the base 10 of the container is a block 9 and mounted on the cover 11 of the container is a suitable bearing 12, having a peripheral flange through which are formed openings 14, these openings registering with openings formed in the cover 11. Mounted rotatably on the cover 11 is a regulating disc 15 provided with blades 15' which are in spaced relation and adapted upon rotation of the disc 15 for opening or closing gradually the openings 11' which are formed in the cover 11. A suitable handle 16 projects outwardly from the disc 15 for manual rotation of the disc 15. Journalled at one end in the block 9 is a shaft 17 which projects through the bearing 12 and is adapted for rotation. Fixedly mounted upon the shaft 17 exterior of the container 7 is a sleeve 18 projecting radially outwardly from which are agitating blades 19, these blades being positioned on the shaft 17 within the cone-shaped hopper 13 which is mounted on the cover 11. It will be noted that the blades 19 do not extend to the bottom of the hopper but are terminated slightly above the bottom. An opening 21 is formed in the container 7 adjacent its upper end and projecting outwardly from the opening 21 is a nipple 20, to which a hose or other suitable conduit may be attached. Fixedly mounted on the shaft 17 adjacent its lower end is a sleeve 22 carrying blades 23, this sleeve 22 being so located on the shaft 17 as to place the blades 23 in the path of the water which is being delivered through the conduit 8 so that as the water enters the container 7 under pressure it will effect a rotation of the shaft 17 through its contact with the blades 23. This rotation of the shaft 17 will, of course, effect a rotation of the mixing blades 19 in the hopper 13 and powder or other similar material placed in the hopper 13 will thereby be agitated and caused to flow downwardly into the container 7 through the openings 11' and 14, the disc 15 being rotated sufficiently to permit the proper amount of material to pass through the openings 11' and 14.

The invention is designed primarily for mixing cleansing powder with water which is flowing and the mixing will be effected through the rotary motion which is given to the water by the blades 23 and by the force of the water entering at a tangent as described. A vortex will be set up in the container 7 so that as the cleansing powder is deposited in the container from the hopper 13 it will drop to the bottom of the vortex and be thoroughly mixed with the water before passing outwardly from the container 7 through the opening 21.

The mechanism described has proven quite efficient in a device of this kind and it is particularly useful where it is desired to direct a spray of water against a body for cleaning purposes, the spray thus directed containing the necessary cleaning powder. After the water passes from the container 7 it may be directed by gravity, if the container 7 is elevated relatively to the object to be cleansed, or forced by a force pump against the object to be cleansed.

While I have illustrated and described the preferred form of structure, I do not wish to limit myself to the precise form of structure shown, but desire to avail myself of such variations and modifications as may come within the scope of the appended claims.

Having thus described my invention what I claim as new and desire to secure by Letters Patent is:

1. A mixer of the class described comprising a container; a hopper exterior of said container and in communication with the interior thereof; agitating means mounted in said hopper; means for delivering a stream of liquid into said container; and means for operating said agitating means for agitating material placed in said hopper, said material in said hopper upon agitation being adapted for passage into said container.

2. A mixer of the class described comprising a container; a hopper exteriorly of said container and in communication with the interior thereof; agitating means mounted in said hopper; means for delivering a stream of liquid into said container; means for operating said agitating means for agitating material placed in said hopper, said material in said hopper upon agitation being adapted for passage into said container; and means for regulating the amount of material passing from said hopper into said container.

3. A mixer of the class described comprising a container having an inlet port formed therein; a conduit for delivering liquid into said container through said inlet port in a direction for effecting an agitation of liquid in said container; a hopper exterior of and communicating with said container; agitating blades mounted in said hopper; means in said container for effecting a rotation of said agitating blades for agitating material placed in said hopper, said material being adapted upon agitation for passage into said container; and means for adjusting the communication of said hopper with said container for regulating the amount of flow of material from said hopper into said container.

4. A mixer of the class described comprising: a container; a hopper exterior of said container and in communication with the interior thereof; agitating means mounted in said hopper; means for delivering a stream of liquid into said container; and means operable during delivery of liquid into said container for operating said agitating means for agitating material placed in said hopper, said material, upon agitation, being adapted for passage into said container.

In testimony whereof I have signed the foregoing.

CLAUDIUS NIELSEN.